United States Patent
Mes

(10) Patent No.: US 7,028,142 B2
(45) Date of Patent: Apr. 11, 2006

(54) SYSTEM AND METHOD FOR REDUCING ACCESS LATENCY TO SHARED PROGRAM MEMORY

(75) Inventor: Ian Mes, Nepean (CA)

(73) Assignee: Ciena Corporation, Linthicum, MD (US)

( * ) Notice: Subject to any disclaimer, the term of this patent is extended or adjusted under 35 U.S.C. 154(b) by 132 days.

(21) Appl. No.: 10/400,184

(22) Filed: Mar. 25, 2003

(65) Prior Publication Data

US 2004/0024976 A1 Feb. 5, 2004

(30) Foreign Application Priority Data

Mar. 25, 2002 (CA) ................................ 2378777

(51) Int. Cl.
*G06F 12/00* (2006.01)

(52) U.S. Cl. ................ 711/137; 711/151; 712/207

(58) Field of Classification Search .............. 711/100, 711/137, 151; 712/200–207
See application file for complete search history.

(56) References Cited

U.S. PATENT DOCUMENTS

| | | | |
|---|---|---|---|
| 4,755,933 A | | 7/1988 | Teshima et al. |
| 5,375,223 A | * | 12/1994 | Meyers et al. ............... 711/151 |
| 5,473,764 A | | 12/1995 | Chi |
| 5,630,075 A | * | 5/1997 | Joshi et al. ................ 711/100 |
| 5,682,521 A | * | 10/1997 | Kubosawa ................ 712/200 |
| 5,740,368 A | * | 4/1998 | Villalpando ............... 709/202 |
| 5,829,042 A | | 10/1998 | Leung |
| 5,835,967 A | | 11/1998 | McMahan |
| 5,948,094 A | | 9/1999 | Solomon et al. |
| 6,138,213 A | * | 10/2000 | McMinn .................... 711/137 |
| 6,247,107 B1 | * | 6/2001 | Christie .................... 711/216 |
| 6,317,811 B1 | * | 11/2001 | Deshpande et al. ........ 711/137 |
| 6,367,006 B1 | | 4/2002 | Tran |

* cited by examiner

*Primary Examiner*—Nasser Moazzami
(74) *Attorney, Agent, or Firm*—Merek, Blackmon & Voorhees, LLC

(57) ABSTRACT

System and method for reducing access latency to a shared program memory. The program memory is shared by more than one processor. The system includes fetch buffers (one per processor), prefetch buffers (one per processor), program fetch logic units (one per processor), and an arbiter. Each fetch buffer stores local instructions that are local to an instruction being used by an associated processor. Each prefetch buffer stores subsequent instructions that are subsequent to the local instructions stored in an associated fetch buffer. Each program fetch logic unit determines from where to fetch a next instruction required by the associated processor. The arbiter arbitrates between instruction fetch requests received for the fetch buffers and the prefetch buffers from the various processors. The arbiter determines which of the instruction fetch requests will next gain access to the program memory. Such a system improves latency by assigning a higher priority to fetch requests over prefetch requests or data requests.

16 Claims, 2 Drawing Sheets

SYSTEM AND METHOD FOR REDUCING ACCESS LATENCY TO SHARED PROGRAM MEMORY

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates generally to systems where multiple processors share a common program memory, and specifically to a system and method for reducing the latency for accessing the memory.

Some processors have separate memories for storing program instructions and program data. These memories are typically referred to as program store and data store, respectively. The access patterns for the program store typically differ from the access patterns for the data store. Program store data is frequently accessed sequentially, as the processor executes one instruction after another. Most instructions do not affect the program address of the next instruction to be executed. Some instructions, such as a branch or a jump, cause the processor to execute an instruction that does not immediately succeed the previously executed instruction in the program store.

However, most instructions are executed sequentially, a concept that is known as the principle of locality. As a result, schemes have been developed to take advantage of this feature for improving processor performance. One such scheme is the introduction of a program store cache. The program store cache stores multiple instructions local to the processor. Typically, the cache comprises memory having faster access time than the program store. However, the improved access time comes at the expense of other design criteria, including cost. As a result, the cache is a typically a fraction the size of the program store. Therefore, the processor can exploit the principle of locality by storing a sequence of instructions in the program store cache. When the processor attempts to access an instruction that is not in the cache, referred to as a cache miss, the cache loads the instruction that the processor is trying to access. However, since the instruction are primarily executed in sequence, cache misses are relatively rare compared to cache hits.

While the solution described above is simple and elegant for single processor devices, the solution becomes complicated for multiprocessor devices. The simplest approach to providing a program store for multiple processors is to provide a single program store for each processor. However, this solution can waste memory, especially when the processors are sharing some of the same program code. By using a single program store for multiple memories, a smaller amount of total memory can be allocated to program store, providing a less expensive solution.

However, one issue that arises when using a single program store for multiple processors is the extra latency that each processor can incur while trying to fetch program instructions. If two or more processors try to access the memory at the same time, one or more processors will need to be held off until the other processor or processors have completed the instruction fetch. Therefore, there is a need for a solution that reduces or eliminates extra latency caused by multiple processors sharing the same program store.

SUMMARY OF THE INVENTION

In accordance with an aspect of the present invention, there is provided a system for reducing latency when accessing a program memory shared by a plurality of processors. The system comprises the following components. A fetch buffer is provided for each of the processors for storing a plurality of instructions local to an instruction being used by an associated processor. A prefetch buffer is provided for each of the processors for storing a plurality of instructions subsequent to the instructions stored in an associated fetch buffer. Program fetch logic for each of the processors determines from where to fetch a next instruction required by the associated processor. An arbiter is provided for arbitrating between instruction fetch requests received for the fetch buffers and the prefetch buffers for determining which of the requests will be granted a next access to the program memory.

In accordance with a further aspect of the present invention there is provided a method for reducing latency for accessing a program memory shared by a plurality of processors. The method comprises the following steps. For each processor, a plurality of instructions local to an instruction being processed by the processor are stored in a fetch buffer. For each processor, a plurality of instructions subsequent to the instructions stored in an associated fetch buffer are stored in a prefetch buffer. A location is determined of a next instruction to be processed by the processor. An instruction fetch request is generated in accordance with the location of the next instruction to be processed by the processor. Arbitration is performed between a plurality of instruction fetch requests received from the fetch and prefetch buffers for determining a priority sequence for accessing the program memory.

BRIEF DESCRIPTION OF THE DRAWINGS

An embodiment of the invention will now be described by way of example only with reference to the following drawings, in which:

FIG. 1b is a block diagram detailing a buffer illustrated in FIG. 1a;

DETAILED DESCRIPTION OF THE PREFERRED EMBODIMENT

Figure 1A:
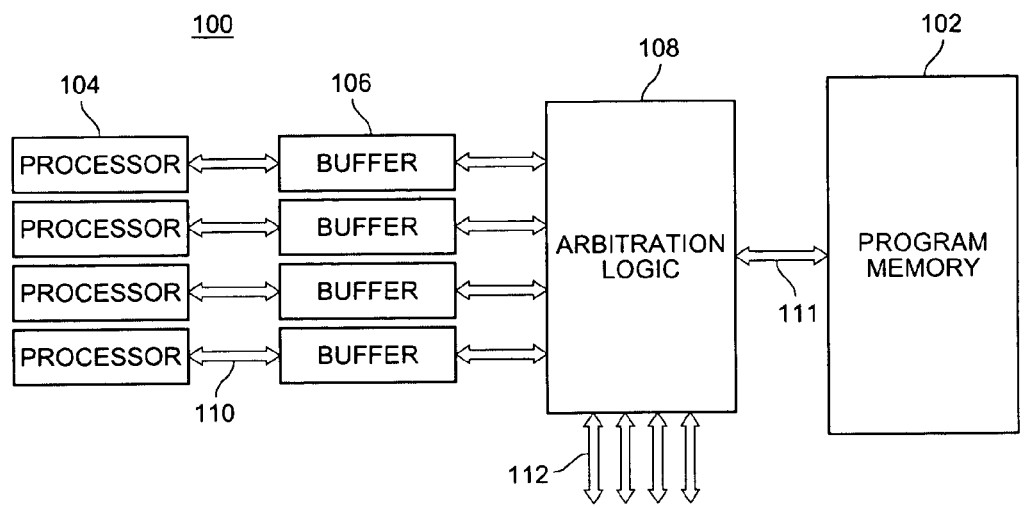
FIG. 1a is a block diagram of a shared program memory, multiprocessor system in accordance with an embodiment of the invention.
Figure 1B:
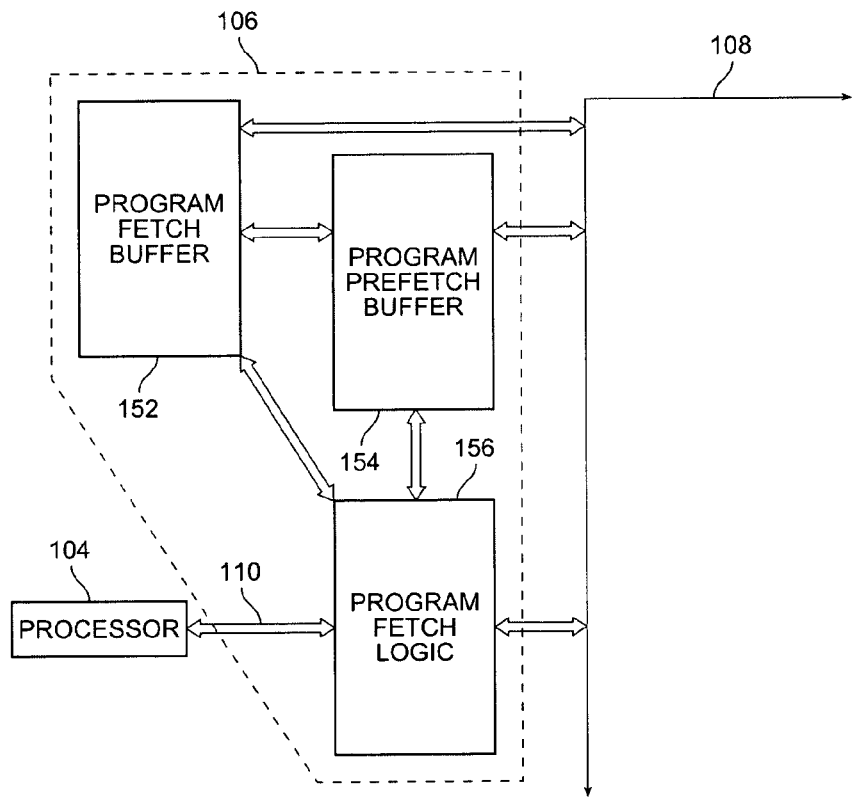

For convenience, like numerals in the description refer to like structures in the drawings. Referring to FIG. 1a, a system architecture for a multiprocessor, shared program memory device is illustrated generally by numeral 100. In the present embodiment, a program memory 102 is shared by four processors 104. Each of the processors 104 has an associated buffer 106, which accesses the program memory 102 via an arbiter 108. Each of the buffers 106 is coupled with its corresponding processor 104 via a program port 110. The arbiter 108 is coupled to the program memory 102 via a memory access port 111. Further, data ports 112 are coupled to the arbiter 108 for providing access to the program memory 102.

referring to FIG. 1b, the buffer 106 is illustrated in greater detail. The buffer 106 includes two storage memories: a program fetch buffer 152 and a program prefetch buffer 154. In addition to being coupled to each other, the fetch buffer 152 and the prefetch buffer 154 are each coupled to both the arbiter 108 and a program fetch logic unit 156. The program fetch logic unit 156 is, in turn, coupled to both the processor 104 and the arbiter 108. It should be noted that the connections illustrated in FIG. 1a and 1b represent logical connections between components in the system. Other logical connections, as well as physical connections, will be apparent to a person skilled in the art.

The program memory 102 is preferably a physical memory in which the program code is stored. The size of the memory 102 varies depending on the application. Instructions are accessed from the program memory 102 via the memory access port 111. The memory access port 111 is a preferably a wide data port. For the purpose of the present description, a word refers to a number of bits handled by a processor in one cycle. One word comprises 32 bits, and according to one embodiment the memory access port 111 is eight words wide. Thus, although a single wide memory can be used, the program memory 102 according to one embodiment comprises eight smaller memories, each memory being one word wide and having its own address bus.

The program fetch buffer 152 is a wide buffer for temporarily storing program instructions. A line of instructions that includes the last instruction accessed via the program port 110 is stored in the program fetch buffer 152. In the present embodiment, a line of instructions comprises eight consecutive instructions. There is a narrow, 32-bit interface to the program port 110, since in the present embodiment each instruction is 32 bits wide. The program fetch buffer 152 has a wide, 256-bit interface to the program memory 102 via the arbiter 108. It also has a wide interface to the program prefetch buffer 154.

The program prefetch buffer 154 is also a wide buffer for temporarily storing program instructions. The instructions stored in the program prefetch buffer 154 include a line of code sequentially following the line of code stored in the program fetch buffer 152. There is a narrow interface between the prefetch buffer and the program port 110. The program prefetch buffer 154 has a wide interface to the program memory 102, via the arbiter 108, and a wide interface to the program fetch buffer 152.

The data ports 112 are a collection of ports that can access the program memory 102 via the arbiter 108. These ports 112 may include data store ports from the processors, or ports from other engines. The types of data ports 112 will vary according to the application, as will be appreciated by a person skilled in the art. Typically, at least one port 112 is needed to download the program instructions into the program memory 102. In the present embodiment, the data ports 112 are 32 bits wide.

The program ports 110 are coupled to program store fetch ports (not shown) of the processors 104. The program store fetch ports retrieve instructions for the processor 104 via the program fetch logic unit 156 from either the program fetch buffer 152, the program prefetch buffer 154, or the program memory 102. As previously mentioned, the program ports 110 of the present embodiment are 32 bits wide. Each processor 104 has a single program port 110 which connects to, and is serviced by, a dedicated instantiation of the program fetch logic unit 156, which is connected in turn to dedicated instantiations of the program fetch buffer 152 and the program prefetch buffer 154.

The program fetch logic unit 156 controls the operation of the program fetch buffer 152 and the program prefetch buffer 154. It also generates requests to the arbiter 108 to return data to the program port 110, or to fill either the program fetch buffer 152 or the program prefetch buffer 154. The program fetch logic unit 156 also controls which data is returned to the program port 110, as will be described in greater detail with reference to the operation of the system.

Figure 2:
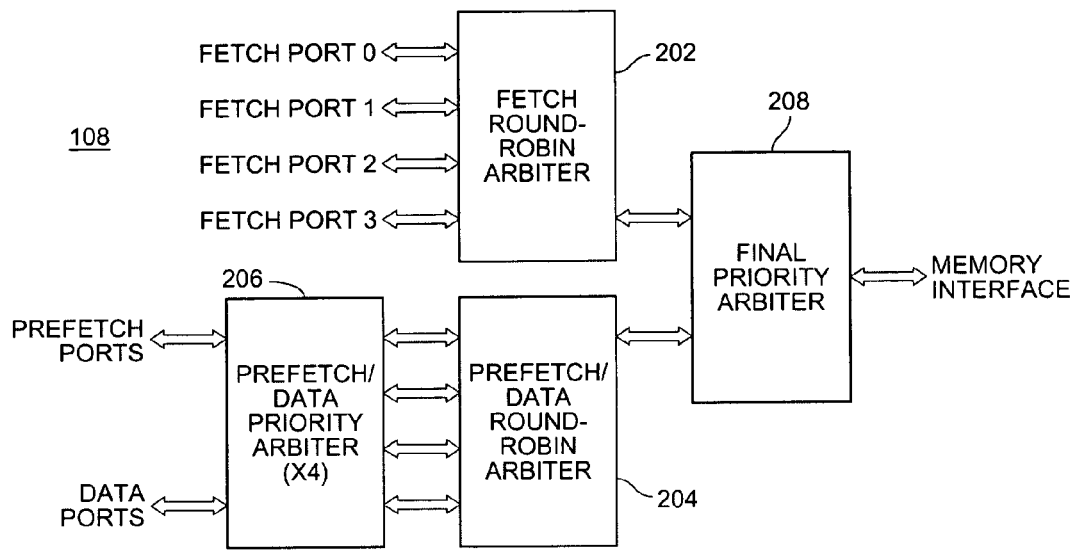
FIG. 2 is a block diagram detailing an arbiter illustrated in FIG. 1.

The arbiter 108 comprises logic used for determining which port will access the program memory 102 on any given cycle. The method of arbitration depends on the application. FIG. 2 illustrates the architecture for the arbiter 108 of the present embodiment. The arbiter 108 includes a fetch round-robin arbiter 202, a prefetch/data round-robin arbiter 204, four prefetch/data priority arbiters 206, and a final priority arbiter 208. The fetch round-robin arbiter 202 is coupled between the processors 104 and the final priority arbiter 208, and arbitrates program fetches between the four processors 104 in a round-robin fashion. That is, each of the processors 104 is given an equal opportunity to request a program instruction fetch. Round robin arbiters are known in the art and, therefore, need not be described in detail.

Each of the prefetch/data priority arbiters 206 is coupled between a corresponding prefetch buffer 154 and a data port at its input side, and the prefetch/data round-robin arbiter 204 at its output side. Each of the prefetch/data priority arbiters 206 arbitrates between the corresponding prefetch buffer 154 and data port in accordance with a predefined priority. Whether the prefetch buffer 154 is given priority over the data port or vice versa is application dependant and can be set accordingly. The prefetch/data round-robin arbiter 204 then arbitrates between each of the prefetch/data priority arbiters 206 in round-robin fashion.

The final priority arbiter 208 arbitrates between fetch accesses and prefetch/data accesses. Fetch accesses are preferably given a higher priority than prefetch/data accesses. As previously described, the program memory 102 of the present embodiment comprises eight separate memories. Each of the memories in the program memory 102 may have an independent arbitration unit. Thus, it is possible to have multiple data fetches in one cycles as long as the data requested is stored in different memories. As a result, since each of the memories can be accessed in one cycle, an eight word wide interface is effectively provided between the arbiter 108 and the program memory 102.

The operation of the architecture described above is detailed as follows. The processor 104 requests instructions from the program memory 102. The program fetch logic unit 156 checks if the instruction word requested is available in the program fetch buffer 152. If the instruction word is in the program fetch buffer 152, the program fetch logic unit 156 retrieves the instruction and provides it to the program port. The contents of the program fetch buffer 152 and the program prefetch buffer 154 remain unchanged.

If the instruction word is not in the program fetch buffer 152, the program fetch logic unit 156 checks if the instruction word requested is available in the program prefetch buffer 154. If the instruction word is in the program prefetch buffer 154, the program fetch logic unit 156 retrieves the instruction and provides it to the program port. The content of the program prefetch buffer 154 is copied to the program fetch buffer 152, and then the content of the program prefetch buffer 154 is invalidated. Several methods are known for invalidating data in a buffer and need not be described in detail. A request for the next line is issued to the arbiter 108. When access to the program memory 102 is granted by the arbiter 108, the line of instructions is copied into the program prefetch buffer 154.

If the instruction word is in neither buffer, the fetch request is passed on to the arbiter 108. When access to the program memory 102 is granted by the arbiter 108, an entire line of instructions is retrieved. The line is copied into the program fetch buffer 152, while the requested word is communicated to the program port. The content of the program prefetch buffer 154 is invalidated. A request for the next line is issued to the arbiter 108. When access to the program memory 102 is granted by the arbiter 108, the line of instructions is copied into the program prefetch buffer 154.

When a processor 104 executes code linearly, it reads words consecutively from the line stored in the program fetch buffer 152. The program prefetch buffer 154 attempts to access the program memory 102 for loading the next line before it is needed by the processor 104. When a processor 104 does not execute instructions linearly (due, for example, to a branch or jump instruction), the program port needs to access the program memory 102 and reload both the program fetch buffer 152 and the program prefetch buffer 154, resulting in a delay. The delay results from retrieving the instructions for the processor 104, not from retrieving the data for the prefetch buffer 154. Rather, the prefetch buffer 154 is filled upon a subsequent access to the program memory 102.

However, the invention improves upon the prior art by reducing the average latency for gaining access to the program memory 102. The latency can be reduced because of the use of both a fetch buffer 152 and a prefetch buffer 154 for each processor 104. Since most of the instructions are typically sequential, most of the accesses to the program memory 102 are going to be requested by the prefetch buffers 154. Therefore, when a non-linear instruction request is generated and the fetch requests access to the program memory 102, it is less likely to encounter fetch requests from other processors 104. As a result, since the fetch request has a higher priority than the prefetch or data requests, it is likely that the fetch request will encounter little, if any, latency for gaining access to the program memory 102. However, standard memory access latency still exists for actually retrieving the data from the memory 102 once access to the memory 102 is achieved. Such a latency is determined in accordance with the memory architecture and is beyond the scope of the present invention. Further, since the processor 104 accesses instructions stored in the fetch buffer 152 before attempting to access instructions stored in the prefetch buffer 154, the prefetch buffer 154 can typically accept a certain maximum latency while accessing the program memory 102, without it adversely affecting any of the processors 104 receiving instructions.

Figure 3:
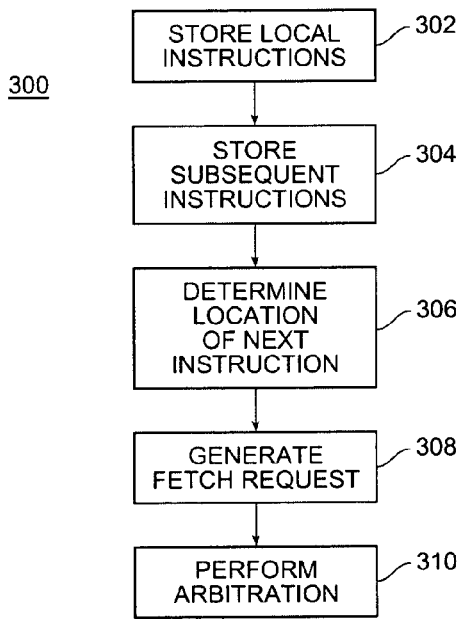
FIG. 3 is a flowchart according to an embodiment of the present invention.

FIG. 3 is a flowchart of a method 300 according to an embodiment of the present invention. In step 302, for each processor 104, local instructions (local to an instruction being processed by that processor) are stored in a fetch buffer 152. In step 304, for each processor 104, subsequent instructions (subsequent to the local instructions) are stored in a prefetch buffer 154. In step 306, the location of the next instruction to be processed by the processor 104 is determined. In step 308, an instruction fetch request in accordance with the location of the next instruction is generated. In step 310, arbitration is performed between instruction fetch requests received from the various fetch buffers 152 and prefetch buffers 154, to determine a priority sequence for accessing the program memory 102. Further details of these steps are provided above.

Although the invention has been described with reference to certain specific embodiments, various modifications thereof will be apparent to those skilled in the art without departing from the spirit and scope of the invention as outlined in the claims appended hereto. For example, the number of processors, the number of bits per word, the number of words per line, and the width of the connection to the memory may vary for different applications. Further, the program memory may also be divided into multiple memory banks, although a single bank is described in this example. Yet further, some processors may execute multiple instructions per cycle, involving more than one instruction word being fetched per cycle. Yet further, the arbiters may be implemented with different round-robin and priority programming, depending on the application. Yet further, although no cache was used in the present embodiment, it is possible to implement the invention including a cache. Preferably, the cache may be located between the fetch port and the processor.

What is claimed is:

1. A system for reducing latency for accessing a program memory shared by a plurality of processors, said system comprising:
   a plurality of fetch buffers, one for each of said plurality of processors, each for storing a plurality of local instructions local to an instruction being used by an associated processor;
   a plurality of prefetch buffers, one for each of said plurality of processors, each for storing a plurality of subsequent instructions subsequent to said plurality of local instructions stored in an associated fetch buffer;
   a plurality of program fetch logic units, one for each of said plurality of processors, each for determining from where to fetch a next instruction required by said associated processor; and
   an arbiter for arbitrating between a plurality of instruction fetch requests received for said plurality of fetch buffers and said plurality of prefetch buffers, for determining which of said plurality of instruction fetch requests will gain a next access to said program memory wherein access to said program memory is a wide interface access for retrieving at least two instructions in one cycle and each of said processors executes one instruction per cycle.

2. A system as defined in claim 1, wherein said plurality of local instructions stored by one of said plurality of fetch buffers is a line of instructions including said instruction being used by said associated processor.

3. A system as defined in claim 1, wherein said arbiter assigns strict priority to said plurality of instruction fetch requests for said plurality of fetch buffers.

4. A system as defined by claim 3, wherein said plurality of instruction fetch requests for said plurality of fetch buffers for different ones of said plurality of processors are arbitrated in a round-robin manner.

5. A system as defined in claim 3, wherein said plurality of instruction fetch requests for said plurality of prefetch buffers for different ones of said plurality of processors are arbitrated in a round-robin manner.

6. A system as defined in claim 5, wherein said arbiter further arbitrates between said plurality of instruction fetch requests for said plurality of prefetch buffers and data access from a data port.

7. A system as defined in claim 1, wherein said program memory comprises a plurality of smaller memories, each having a narrow interface and a dedicated bus, such that all of said plurality of smaller memories are capable of being accessed within one cycle, thereby implementing said wide interface.

8. A method for reducing latency for accessing a program memory shared by a plurality of processors, said method comprising the steps of:
   (a) for each processor, storing in a fetch buffer a plurality of local instructions local to an instruction being processed by said each processor;
   (b) for each processor, storing in a prefetch buffer a plurality of subsequent instructions subsequent to said plurality of local instructions stored in an associated fetch buffer;
   (c) determining a location of a next instruction to be processed by a processor;
   (d) generating an instruction fetch request in accordance with said location of said next instruction to be processed by said processor; and
   (e) arbitrating between a plurality of instruction fetch requests received from said fetch buffer and said prefetch buffer for determining a priority sequence for accessing said program memory wherein access to said program memory is a wide interface access for retrieving at least two instructions in one cycle and each of said processors executes one instruction per cycle.

9. A method as defined in claim 8, wherein if said location of said next instruction to be processed by said processor is said fetch buffer, no instruction fetch request is generated.

10. A method as defined in claim 8, wherein if the location of said next instruction to be processed by said processor is in the prefetch buffer, contents of the prefetch buffer are copied to the fetch buffer and said instruction fetch request is generated from the prefetch buffer.

11. A method as defined in claim 8, wherein if said location of said next instruction to be processed by said processor is neither said prefetch buffer nor said fetch buffer, said instruction fetch request is generated from said fetch buffer.

12. A method as defined in claim 8, wherein during said step of arbitrating, strict priority is provided to said instruction fetch request for said fetch buffer.

13. A method as defined by claim 8, wherein said plurality of instruction fetch requests for a plurality of fetch buffers for different processors are arbitrated in a round-robin manner.

14. A method as defined in claim 8, wherein said plurality of instruction fetch requests for a plurality of prefetch buffers for different processors are arbitrated in a round-robin manner.

15. A method as defined in claim 8, wherein said step of arbitrating further includes arbitrating between said plurality of instruction fetch requests for a plurality of prefetch buffers and data access from a data port.

16. A system for reducing latency for accessing a program memory shared by a plurality of processors, said system comprising:
   a plurality of fetch buffers, one for each of said plurality of processors, each for storing a plurality of local instructions local to an instruction being used by an associated processor;
   a plurality of prefetch buffers, one for each of said plurality of processors, each for storing a plurality of subsequent instructions subsequent to said plurality of local instructions stored in an associated fetch buffer;
   a plurality of program fetch logic units, one for each of said plurality of processors, each for determining from where to fetch a next instruction required by said associated processor; and
   an arbiter for arbitrating between a plurality of instruction fetch requests received for said plurality of fetch buffers and said plurality of prefetch buffers, for determining which of said plurality of instruction fetch requests will gain a next access to said program memory wherein access to said program memory is a wide interface access for retrieving a first number of instructions in one cycle and each of said processors executes a second number of instructions per cycle with said second number being less than said first number.

* * * * *